United States Patent
Yamaguchi et al.

(10) Patent No.: US 7,644,614 B2
(45) Date of Patent: Jan. 12, 2010

(54) FLOW QUANTITY MEASURING DEVICE

(75) Inventors: Junzo Yamaguchi, Nagoya (JP); Yasushi Kohno, Obu (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 12/108,313

(22) Filed: Apr. 23, 2008

(65) Prior Publication Data
US 2008/0264154 A1 Oct. 30, 2008

(30) Foreign Application Priority Data
Apr. 27, 2007 (JP) .............................. 2007-118992

(51) Int. Cl.
*G01F 1/68* (2006.01)
(52) U.S. Cl. .................................. 73/204.26
(58) Field of Classification Search .............. 73/204.24, 73/204.25, 204.26
See application file for complete search history.

(56) References Cited

U.S. PATENT DOCUMENTS

| | | | |
|---|---|---|---|
| 5,936,157 A * | 8/1999 | Yamashita et al. | 73/204.26 |
| 6,862,930 B1 | 3/2005 | Kohno et al. | |
| 6,988,399 B1 * | 1/2006 | Watanabe et al. | 73/204.26 |
| 7,137,298 B2 * | 11/2006 | Matsumoto et al. | 73/204.26 |
| 7,404,320 B2 * | 7/2008 | Sakuma et al. | 73/204.26 |

FOREIGN PATENT DOCUMENTS

| | | |
|---|---|---|
| JP | 10-253414 | 9/1998 |
| JP | 2003-166864 | 6/2003 |

OTHER PUBLICATIONS

Japanese Office Action dated Jan. 13, 2009 issued in corresponding Japanese Application No. 2007-118992, with English translation.
Japanese Office Action dated Sep. 29, 2009, issued in counterpart Japanese Application No. 2007-118992, with English translation.

* cited by examiner

*Primary Examiner*—Jewel Thompson
(74) *Attorney, Agent, or Firm*—Nixon & Vanderhye, PC

(57) ABSTRACT

In a flow quantity measuring device, each of upstream side and downstream side sensing resistors, which are placed on an upstream side and a downstream side, respectively, of a heating resistor, includes resistor elements, each of which forms a folded path. The folded path has a generally constant width along an entire extent thereof and is returned at each of first and second longitudinal end edges of a sensing area. The heating resistor forms a folded path, which has a generally constant width along an entire extent thereof and is returned at the second longitudinal end edge of the heat generating area. First and second ends of the folded path of the heating resistor projects beyond the first longitudinal end edge of the sensing area on a first side of the flow quantity measuring device.

10 Claims, 4 Drawing Sheets

FLOW QUANTITY MEASURING DEVICE

CROSS REFERENCE TO RELATED APPLICATION

This application is based on and incorporates herein by reference Japanese Patent Application No. 2007-118992 filed on Apr. 27, 2007.

BACKGROUND OF THE INVENTION

1. Field of the Invention

The present invention relates to a flow quantity measuring device, which measures a flow quantity of air.

2. Description of Related Art

For instance, a thermal-type flow quantity measuring device has been proposed to measure a flow quantity of air at an airflow passage, such as a flow quantity of intake air for an internal combustion engine (see for example, Japanese Unexamined Patent Publication No. 2000-193505 corresponding to U.S. Pat. No. 6,862,930). FIG. 5 illustrates one previously proposed flow quantity measuring device 100, which includes a dielectric film 101, a heating resistor 103, an upstream side sensing resistor 104 and a downstream side sensing resistor 105. The dielectric film 101 extends along a plane that is generally parallel to a flow of the air in an airflow passage. The heating resistor 103 is placed over a surface 102 of the dielectric film 101 and generates a heat upon energization. The upstream side sensing resistor 104 and the downstream side sensing resistor 105 are provided on an upstream side and a downstream side, respectively, of the heating resistor 103 on the surface 102. The electric resistances of the upstream side sensing resistor 104 and the downstream side sensing resistor 105 change in response to the temperature. A flow quantity of the air, which passes through the airflow passage, is measured based on a measurement difference between a measurement of the upstream side sensing resistor 104 and a measurement of the downstream side sensing resistor 105.

That is, in the flow quantity measuring device 100, an area, which is held between the upstream side sensing resistor 104 and the downstream side sensing resistor 105 on the surface 102 of the dielectric film 101, forms a sensing area 108, which senses the measurement difference. A heat generating area 109, which is formed by the heating resistor 103, heats the sensing area 108, so that the temperature distribution is created in a flow direction of the air in the sensing area 108. The measurement difference, which corresponds to the temperature distribution, is sensed and is used to determine the flow quantity of the air. A portion of the total amount of heat, which is applied from the heat generating area 109 to the sensing area 108, is used to heat the sensing area 108, i.e., is used to create the temperature distribution. It is conceivable that when a percentage of this portion relative to the total amount of heat is increased, the flow quantity measurement sensitivity is increased to reduce the measurement error.

The heat, which is applied from the heat generating area 109 to the sensing area 108, is not entirely used to heat the sensing area 108. That is, a portion of the heat, which is applied from the heat generating area 109 to the sensing area 108, is released without heating the sensing area 108. Particularly, terminals 110, 111 of the heating resistor 103 are directly connected to the heating resistor 103 to receive the heat from the heating resistor 103. Also, the terminals 110, 111 have a relatively low heat transfer resistance. Thus, the terminals 110, 111 serve as heat sinks for releasing the heat from the heat generating area 109.

In view of the above point, in the flow quantity measuring device 100, electric potential ends 114, 115 of the heating resistor 103, which are connected to the terminals 110, 111, are placed at a first end edge 116 of the sensing area 108, so that the releasing of the heat from the heat generating area 109 to the terminals 110, 111 is performed at the first end side of the sensing area 108. In this way, the amount of heat release to the terminals 110, 111 can be reduced in comparison to the case where the electric potential terminals 114, 115 are placed at the first end edge 116 and a second end edge 1171 respectively, of the sensing area 108 to perform the releasing of the heat from the heat generating area 109 to the terminals 110, 111 at the first end side and the second end side of the sensing area 108.

However, even when the electric potential ends 114, 115 are placed at the first end edge 116, the amount of heat released from the electric potential ends 114, 115 to the terminals 110, 111 is still relatively large. Therefore, it is demanded to further improve the flow quantity measurement sensitivity.

SUMMARY OF THE INVENTION

The present invention addresses the above disadvantages. Thus, it is an objective of the present invention to improve a flow quantity measurement sensitivity in a flow quantity measuring device, which measures a flow quantity of the air based on a measurement difference between an upstream side sensing resistor and a downstream side sensing resistor, which are provided on an upstream side and a downstream side, respectively, of a heating resistor.

To achieve the objective of the present invention, there is provided a flow quantity measuring device that measures a flow quantity of air at an airflow passage and includes a dielectric film, a heating resistor, an upstream side sensing resistor and a downstream side sensing resistor. The dielectric film extends along a plane, which is generally parallel to a flow direction of the air in the airflow passage. The heating resistor is placed on a surface of the dielectric film and generates heat upon energization thereof. The upstream side sensing resistor is placed on an upstream side of the heating resistor with respect to a flow direction of the air on the surface of the dielectric film and changes an electric resistance thereof in response to temperature. The downstream side sensing resistor is placed on a downstream side of the heating resistor with respect to the flow direction of the air on the surface of the dielectric film and changes an electric resistance thereof in response to temperature. The flow quantity measuring device measures the flow quantity of the air, which flows in the airflow passage, based on a measurement difference between a measurement of the upstream side sensing resistor and a measurement of the downstream side sensing resistor. The upstream side sensing resistor and the downstream side sensing resistor extend generally parallel to each other in a longitudinal direction thereof, which is generally perpendicular to the flow direction of the air and is generally parallel to the surface of the dielectric film. An area, which is held between and is defined by the upstream side sensing resistor and the downstream side sensing resistor on the surface of the dielectric film, forms a sensing area that is provided to sense the measurement difference and has first and second longitudinal end edges located on first and second sides, respectively, of the flow quantity measuring device. The heating resistor forms a heat generating area that heats the sensing area and has first and second longitudinal end edges located on the first and second sides, respectively, of the flow quantity measuring device. First and second electric potential ends of the heating resistor are placed at the first longitudinal end edge of the heat generating area. The first longitudinal end edge of the heat generating area projects from the first longitudinal end edge of the sensing area toward the first side of the flow quantity measuring device.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

First Embodiment

Figure 1A:
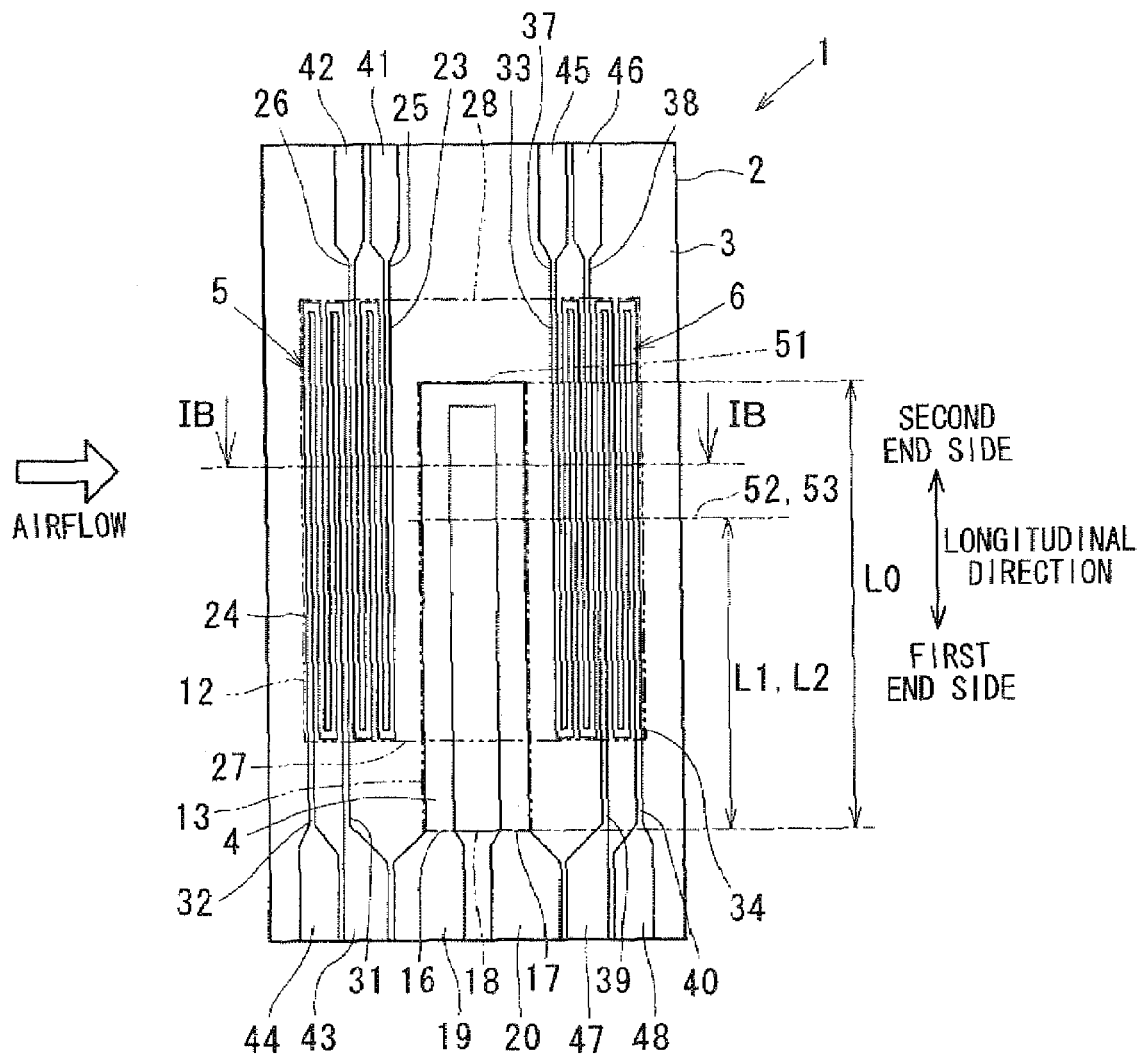
FIG. 1A is a schematic diagram showing a structure of a flow quantity measuring device according to a first embodiment of the present invention.
Figure 1B:
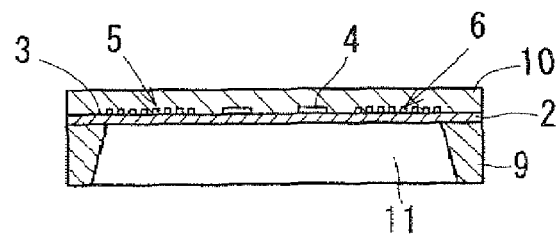
FIG. 1B is a cross sectional view taken along line 1B-1B in FIG. 1A.

A structure of a flow quantity measuring device 1 according to a first embodiment of the present invention will be described with reference to FIGS. 1A and 1B. For example, a flow quantity measuring device 1 may be used to measure a flow quantity of air, which is drawn into an internal combustion engine as intake air through an airflow passage.

The flow quantity measuring device 1 includes a dielectric film (dielectric layer) 2, a heating resistor 4, an upstream side sensing resistor 5 and a downstream side sensing resistor 6. The dielectric film 2 extends along a plane that is generally parallel to a flow (a flow direction) of the air in the airflow passage. The heating resistor 4 is placed on a surface 3 of the dielectric film 2 and generates heat upon energization. The upstream side sensing resistor 5 and the downstream side sensing resistor 6 are provided on an upstream side and a downstream side, respectively, of the heating resistor 4 on the surface 3. An electric resistance of the upstream side sensing resistor 5 and an electric resistance of the downstream side sensing resistor 6 change in response to the temperature thereof. A flow quantity of the air, which passes through the airflow passage, is measured based on a measurement difference between the measurement of the upstream side sensing resistor 5 and the measurement of the downstream side sensing resistor 6.

In the following description, a direction, which is generally parallel to the surface 3 of the dielectric film 2 and is generally perpendicular to the flow of the air, will be defined as a longitudinal direction for the descriptive purpose.

The dielectric film 2 is formed on a surface of a substrate 9, which is generally parallel to the flow of the air in the airflow passage. The heating resistor 4, the upstream side sensing resistor 5 and the downstream side sensing resistor 6 are provided on the surface 3 of the dielectric film 2 and are covered with a protective film (protective layer) 10. A cavity 11 is formed on a backside of the dielectric film 2 to thermally insulate the substrate 9 from the heating resistor 4, the upstream side sensing resistor 5 and the downstream side sensing resistor 6.

The heating resistor 4 is made of a single resistor element and is folded once along its conductive path to form a U-shaped configuration. The conductive path of the heating resistor 4 may have a generally constant width along an entire extent thereof. The heating resistor 4 forms a heat generating area 13 on the surface 3 to heat a sensing area 12 described below. The heat generating area 13 is formed into a rectangular configuration having a generally rectangular outer boundary, which circumscribes the heating resistor 4. Electric potential ends (first and second electric potential ends, i.e., first and second ends of the conductive path) 16, 17 of the heating resistor 4 are placed at a first longitudinal end edge (hereinafter, simply referred to as a first end edge) 18 of the heat generating area 13. Terminals 19, 20 are connected to the electric potential ends 16, 17, respectively, to conned with an external circuit.

The upstream side sensing resistor 5 and the downstream side sensing resistor 6 extend parallel to each other in the longitudinal direction thereof. A rectangular area, which is held between the upstream side sensing resistor 5 and the downstream side resistor 6, forms the sensing area 12 for sensing, i.e., obtaining the measurement difference and is heated by the heat generating area 13. More specifically, the sensing area 12 is the rectangular area, which is defined between an upstream side lateral edge (a left lateral edge in FIG. 1A) of the upstream side sensing resistor 5 and a downstream side lateral edge (a right lateral edge in FIG. 1A) of the downstream side sensing resistor 6 in the flow direction of the air.

The upstream side sensing resistor 5 includes a heating resistor side resistor element (a right side resistor element in FIG. 1A) 23 and a counter heating resistor side resistor element (a left side resistor element in FIG. 1A) 24. The resistor element 23 forms a folded conductive path and has electric potential ends (first and second electric potential ends, i.e., first and second ends of the conductive path) 25, 26, which extend out from the second end edge 28 of the sensing area 12 on the second side of the flow quantity measuring device 1. The resistor element 23 is folded twice in two first side return points, respectively, at a first longitudinal end edge (hereinafter, simply referred to as a first end edge) 27 of the sensing area 12 and is folded once in a second side return point at a second longitudinal end edge (hereinafter, simply referred to as a second edge) 28. The resistor element 24 forms a folded conductive path and has electric potential ends (first and second electric potential ends, i.e., first and second ends of the conductive path) 31, 32, which extend out from the first end edge 27 of the sensing area 12 on the first side of the flow quantity measuring device 1. The resistor element 24 is folded twice in two second side return points, respectively, at the second end edge 28 of the sensing area 12 and is folded once in one first side return point at the first end edge 27. The conductive path of each of the resistor elements 23, 24 may have a generally constant width along an entire extent thereof.

Similarly, the downstream side sensing resistor 6 includes a heating resistor side resistor element (a left side resistor element in FIG. 1A) 33 and a counter heating resistor side resistor element (a right side resistor element) 34. The resistor element 33 has a structure that is similar to that of the resistor element 23, and the resistor element 34 has a structure that is similar to that of the resistor element 24.

More specifically, the electric potential ends 25, 26 of the resistor element 23 and electric potential ends (first and second electric potential ends) 37, 38 of the resistor element 33 extend out from the second end edge 28 of the sensing area 12 on the second side of the flow quantity measuring device 1, and the electric potential ends 31, 32 of the resistor element 24 and electric potential ends (first and second electric potential ends) 39, 40 of the resistor element 34 extend out from the first end edge 27 of the sensing area 12 on the first side of the flow quantity measuring device 1. Furthermore, terminals 41-48 for connecting with the external circuit are connected to the electric potential ends 25, 26, 31, 32 of the upstream side sensing resistor 5 and the electric potential ends 37-40 of the downstream side sensing resistor 6.

Next, the characteristics of the flow quantity measuring device 1 will be described.

In the flow quantity measuring device 1 of the first embodiment, a distance L0 between the first end edge 18 and a second longitudinal end edge (hereinafter, simply referred to as a second end edge) 51 of the heat generating area 13 and a distance L1 between a one half (½) length position 52 of the upstream and downstream side resistors 5, 6 (i.e., a half location at ½ of the length of the upstream and downstream side resistors 5, 6) and the first end edge 18 satisfy the following equation (1) of: 54/100≦L1/L0≦81/100. Because of this, the first end edge 18 of the heat generating area 13 extends out from the first end edge 27 of the sensing area 12 on the first side of the flow quantity measuring device 1.

Furthermore, a distance L2 between a longitudinal position 53, at which the temperature difference between the upstream side and the downstream side of the heating resistor 4 is maximum, and the first end edge 18 is generally the same as the distance L1. That is, the position 52 and the position 53 coincide with each other in the longitudinal direction.

Now, advantages of the first embodiment will be described.

In the flow quantity measuring device 1 of the first embodiment, the first end edge 18 of the heat generating area 13, at which the electric potential ends 16, 17 are placed, projects out in the longitudinal direction from the first end edge 27 of the sensing area 12 on the first side of the flow quantity measuring device 1, so that the area around the electric potential ends 16, 17, at which the formation of the temperature distribution is unclear in the heat generating area 13, is substantially eliminated from the sensing area 12. In this way, only the other area of the heat generating area 13, in which the formation of the temperature distribution is clear, can be included in the sensing area 12. As a result, the sensitivity of the flow quantity measurement can be improved.

Figure 2:
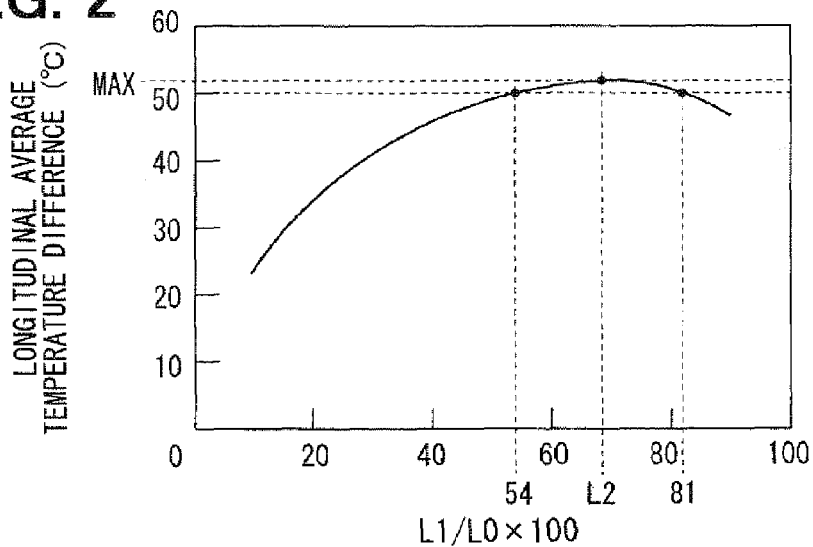
FIG. 2 is a diagram showing a relationship between L1/L0 and an average temperature difference, which is determined based on the measurement difference between an upstream side sensing resistor and a downstream side sensing resistor according to the first embodiment.

Furthermore, when the heat generating area 13 and the sensing area 12 are set to satisfy the above equation (1), the longitudinal average temperature difference, which is computed based on the measurement difference between the upstream side sensing resistor 5 and the downstream side sensing resistor 6, can be made to 50 degree Celsius or higher (see FIG. 2). Therefore, the flow quantity measurement sensitivity can be reliably improved.

Also, when the heat generating area 13 and the sensing area 12 are set such that the distance L1 and the distance L2, which satisfy the equation (1), are equal to each other, the longitudinal average temperature difference, which is computed based on the measurement difference between the upstream side sensing resistor 5 and the downstream side sensing resistor 6, can be made to coincide with the maximum value MAX (see FIG. 2). Therefore, the flow quantity measurement sensitivity can be increased to the maximum level.

Second Embodiment

Figure 3:
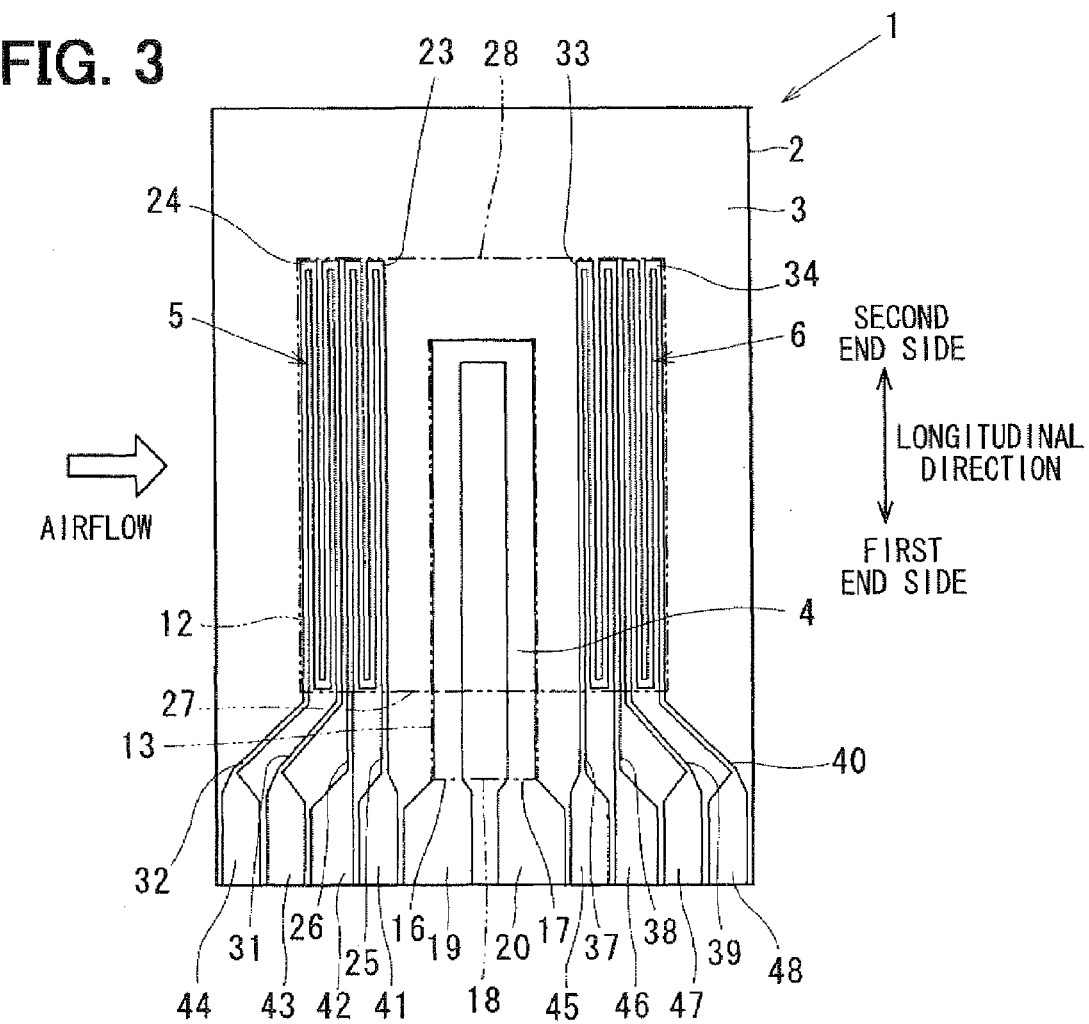
FIG. 3 is a schematic diagram showing a structure of a flow quantity measuring device according to a second embodiment of the present invention.

A structure of a flow quantity measuring device 1 according to a second embodiment of the present invention will be described with reference to FIG. 3. In the second embodiment, components, which are similar to those of the first embodiment, will be indicated by the same reference numerals.

In the flow quantity measuring device 1 of the second embodiment, similar to the resistor elements 24, 34, the resistor elements 23, 33 are configured such that the electric potential ends 25, 26 of the resistor element 23 and the electric potential ends 37, 38 of the resistor element 33 extend out from the first end edge 27 of the sensing area 12, and the resistor elements 23, 33 are folded twice at the second end edge 28 of the sensing area 12 and are also folded once at the first end edge 27. Specifically, the electric potential ends 25, 26, 31, 32 of the upstream side sensing resistor 5 and the electric potential ends 37-40 of the downstream side sensing resistor 6 all extend out from the first end edge 27 of the sensing area 12 on the first side of the flow quantity measuring device 1.

Here, the heat, which is applied from the heating resistor 4 to the sensing area 12, is also conducted to the upstream side sensing resistor 5 and the downstream side sensing resistor 6. Therefore, the terminals 41-44, which are connected to the electric potential ends 26, 31, 32 of the upstream side sensing resistor 5 and the terminals 45-48, which are connected to the electric potential ends 37-40 of the downstream side sensing resistor 6, serve as heat sinks. Thus, when the electric potential ends 25, 26, 31, 32 of the upstream side sensing resistor 5 and the electric potential ends 37-40 of the downstream side sensing resistor 6 extend out only from the first end edge 27 of the sensing area 12, the amount of heat release to the terminals 41-48 of the upstream side sensing resistor 5 and of the downstream side sensing resistor 6 can be made smaller than the case where the electric potential ends 25, 26, 31, 32 of the upstream side sensing resistor 5 and the electric potential ends 37-40 of the downstream side sensing resistor 6 extend out from the first end edge 27 and the second end edge 28. Therefore, the temperature distribution can be made more clearly, and thereby the flow quantity measurement sensitivity can be further improved.

Now, modifications of the first and second embodiments will be described.

In the first embodiment, the distance L1 and the distance L2 are generally equal to each other. However, the longitudinal average temperature difference, which is computed based on the measurement difference between the upstream side sensing resistor 5 and the downstream side sensing resistor 6, can be made equal to or higher than 50 degrees Celsius as long as the equation (1) is satisfied even if the distance L1 is not equal to the distance L2. Also, even in the case where the distance L1 does not satisfy the equation (1), as long as the first end edge 18 of the heat generating area 13 projects further from the first end edge 27 of the sensing area 12 on the first side of the flow quantity measuring device 1, the area around the electric potential ends 16, 17 at which the formation of the temperature distribution is unclear in the heat generating area 13, can be substantially eliminated from the sensing area 12. Thus, the flow quantity measurement sensitivity can be increased.

In addition, according to the first and second embodiments, the heating resistor 4 is configured into the U-shape. Alternatively, similar to the resistor elements 23, 24, 33, 34, the heating resistor 4 can be folded an odd number of times, which is equal to or more than three.

Figure 4:
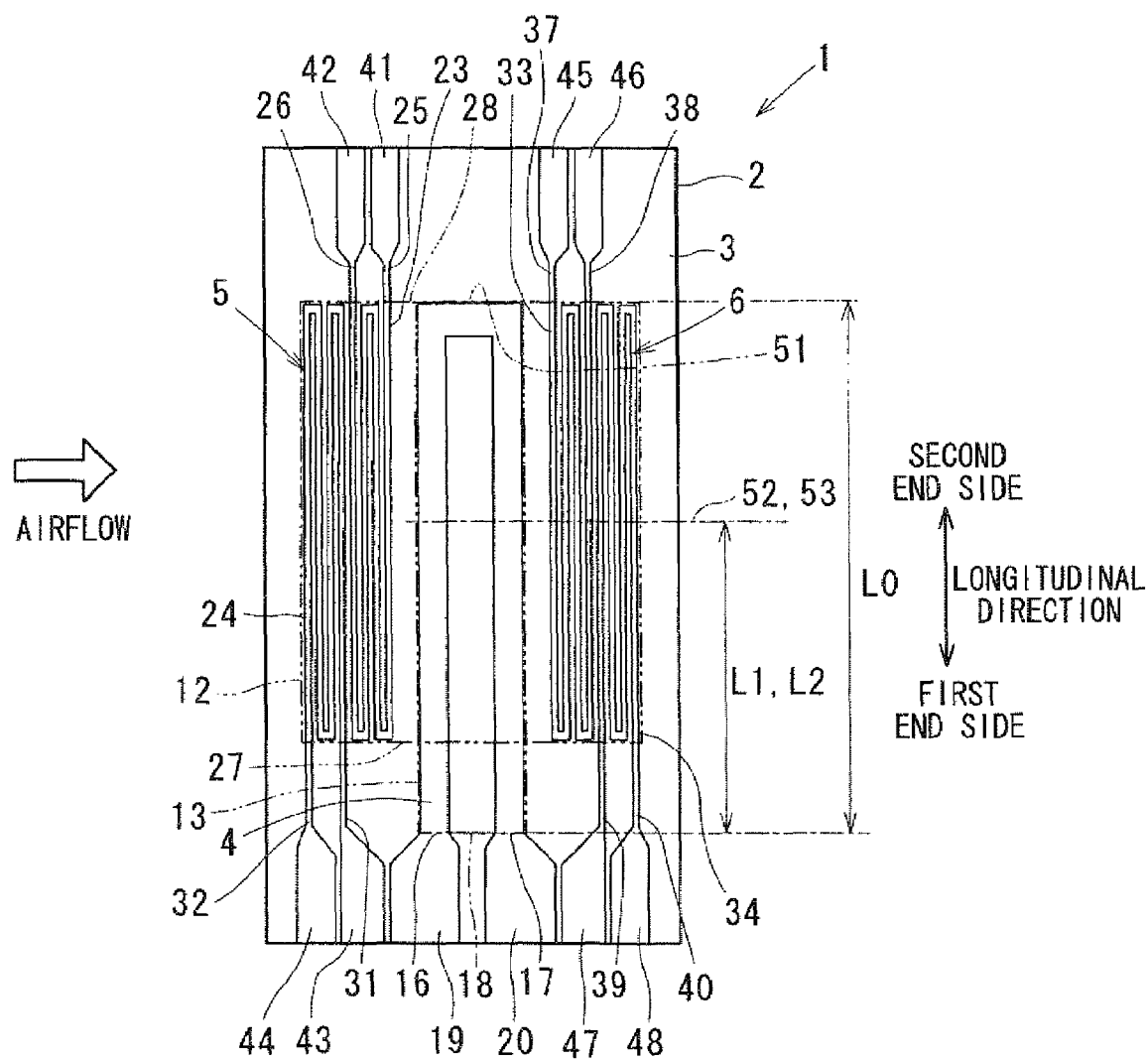
FIG. 4 is a schematic diagram showing a modification of the first embodiment.
Figure 5:
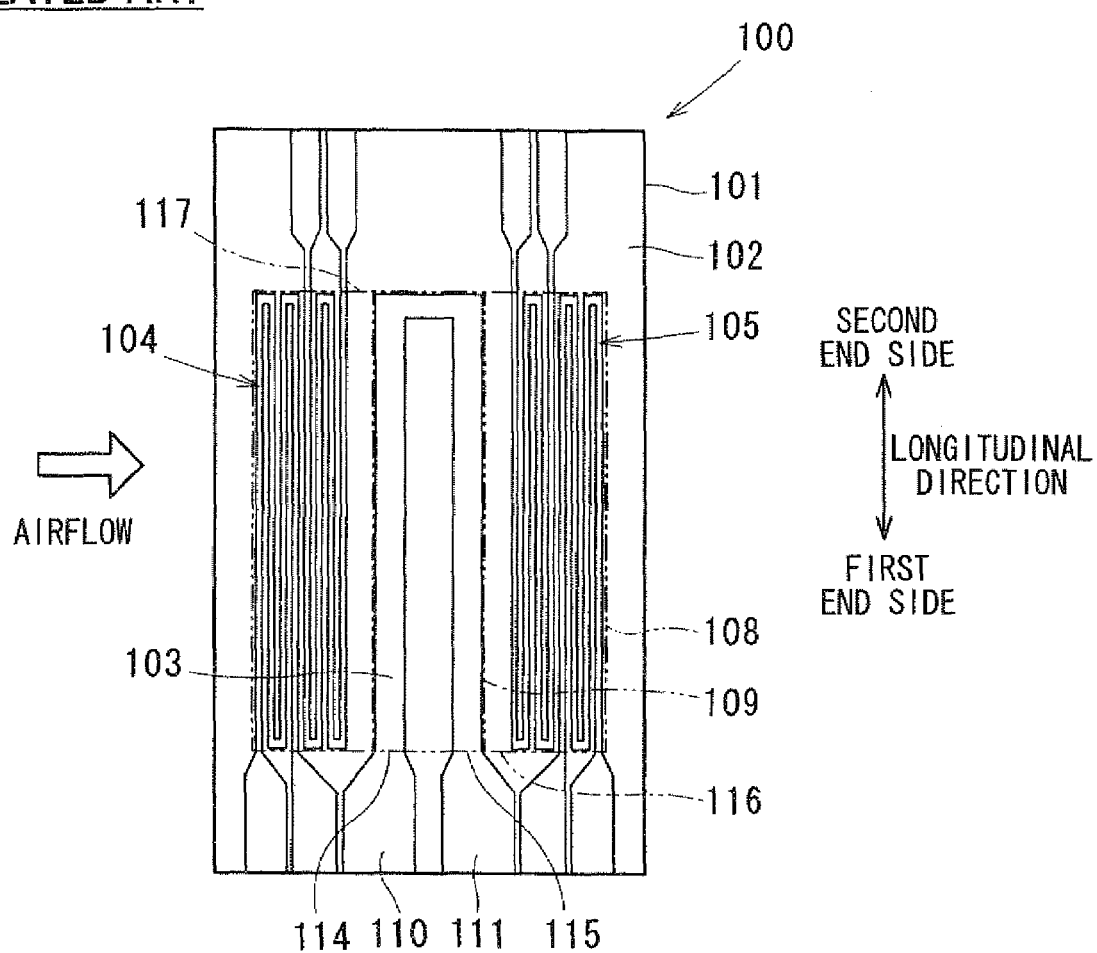
FIG. 5 is a schematic diagram showing a structure of a flow quantity measuring device according to a previously proposed technique.

Furthermore, in the first and second embodiments, the second end edge 51 of the heat generating area 13 is displaced by a predetermined amount from the second end edge 28 of the sensing area 12 on the first side of the flow quantity measuring device. Alternatively, as shown in FIG. 4, the heating resistor 4 of FIG. 1A may be reconfigured such that the second end edge 51 of the heat generating area 13 is placed at the same longitudinal location as that of the second end edge 28 of the sensing area 12. Even with this modification, the advantages described with reference to the first embodiment can be achieved.

Additional advantages and modifications will readily occur to those skilled in the art. The invention in its broader terms is therefore not limited to the specific details, representative apparatus, and illustrative examples shown and described.

What is claimed is:

1. A flow quantity measuring device that measures a flow quantity of air at an airflow passage, the flow quantity measuring device comprising:
   a dielectric film that extends along a plane, which is generally parallel to a flow direction of the air in the airflow passage;
   a heating resistor that is placed on a surface of the dielectric film and generates heat upon energization thereof;
   an upstream side sensing resistor that is placed on an upstream side of the heating resistor with respect to a flow direction of the air on the surface of the dielectric film and changes an electric resistance thereof in response to temperature; and
   a downstream side sensing resistor that is placed on a downstream side of the heating resistor with respect to the flow direction of the air on the surface of the dielectric film and changes an electric resistance thereof in response to temperature, wherein:
   the flow quantity measuring device measures the flow quantity of the air, which flows in the airflow passage, based on a measurement difference between a measurement of the upstream side sensing resistor and a measurement of the downstream side sensing resistor;
   the upstream side sensing resistor and the downstream side sensing resistor extend generally parallel to each other in a longitudinal direction thereof, which is generally perpendicular to the flow direction of the air and is generally parallel to the surface of the dielectric film;
   an area, which is held between and is defined by the upstream side sensing resistor and the downstream side sensing resistor on the surface of the dielectric film, forms a sensing area that is provided to sense the measurement difference and has first and second longitudinal end edges located on first and second sides, respectively, of the flow quantity measuring device;
   the heating resistor forms a heat generating area that heats the sensing area and has first and second longitudinal end edges located on the first and second sides, respectively, of the flow quantity measuring device;
   first and second electric potential ends of the heating resistor are placed at the first longitudinal end edge of the heat generating area;
   the first longitudinal end edge of the heat generating area projects from the first longitudinal end edge of the sensing area toward the first side of the flow quantity measuring device;
   the upstream side sensing resistor is provided with a plurality of electric potential ends;
   the downstream side sensing resistor is provided with a plurality of electric potential ends;
   one half of a total number of the plurality of electric potential ends of the upstream side sensing resistor and the plurality of electric potential ends of the downstream side sensing resistor extend out from the sensing area in a first direction; and
   an other one half of the total number of the plurality of electric potential ends of the upstream side sensing resistor and the plurality of electric potential ends of the downstream side sensing resistor extend out from the sensing area in a second direction, which is opposite from the first direction.

2. The flow quantity measuring device according to claim 1, wherein the heating resistor, the upstream side sensing resistor and the downstream side sensing resistor are configured to satisfy a following equation:

$$54/100 \leq L1/L0 \leq 81/100$$

where $L0$ denotes a distance between the first longitudinal end edge and the second longitudinal end edge of the heat generating area measured in the longitudinal direction, and $L1$ denotes a distance between the first longitudinal end edge of the heat generating area and a half location at ½ of a length of the upstream side and downstream side sensing resistors.

3. The flow quantity measuring device according to claim 2, wherein a distance between the first longitudinal end edge of the heat generating area and a longitudinal location, at which a temperature difference between an upstream side and a downstream side of the heating resistor is maximum, is generally the same as the distance between the first longitudinal end edge of the heat generating area and the half location.

4. The flow quantity measuring device according to claim 1, wherein first and second electric potential ends of each of the upstream side and downstream side sensing resistors extend out from the first longitudinal end edge of the sensing area on the first side of the flow quantity measuring device.

5. The flow quantity measuring device according to claim 1, wherein the second longitudinal end edge of the heat generating area is displaced by a first amount from the second longitudinal end edge of the sensing area on the first side of the flow quantity measuring device.

6. The flow quantity measuring device according to claim 1, wherein the second longitudinal end edge of the heat generating area is placed at the same longitudinal location as that of the second longitudinal end edge of the sensing area.

7. The flow quantity measuring device according to claim 1, wherein:
   the upstream side sensing resistor includes at least one resistor element that forms a folded path, which has a generally constant width along an entire extent thereof and is returned at each of the first and second longitudinal end edges of the sensing area;
   the downstream side sensing resistor includes at least one resistor element that forms a folded path, which has a generally constant width along an entire extent thereof and is returned at each of the first and second longitudinal end edges of the sensing area;
   the heating resistor forms a folded path, which has a generally constant width along an entire extent thereof and is returned at the second longitudinal end edge of the heat generating area; and
   the first and second electric potential ends of the heating resistor forms first and second ends of the folded path of the heating resistor and projects beyond the first longitudinal end edge of the sensing area on the first side of the flow quantity measuring device.

8. The flow quantity measuring device according to claim 1, wherein one half of the plurality of electric potential ends of the upstream side sensing resistor extend out from the sensing area in the first direction, one half of the electric potential ends of the downstream side sensing resistor extend out from the sensing area in the first direction, the other half of the electric potential ends of the upstream side sensing resistor extend out from the sensing area in the second direction and the other half of the electric potential ends of the downstream side sensing resistor extend out from the sensing area in the second direction.

9. A flow quantity measuring device that measures a flow quantity of air at an airflow passage, the flow quantity measuring device comprising:

a dielectric film that extends along a plane, which is generally parallel to a flow direction of the air in the airflow passage;

a heating resistor that is placed on a surface of the dielectric film and generates heat upon energization thereof;

an upstream side sensing resistor that is placed on an upstream side of the heating resistor with respect to a flow direction of the air on the surface of the dielectric film and changes an electric resistance thereof in response to temperature; and a downstream side sensing resistor that is placed on a downstream side of the heating resistor with respect to the flow direction of the air on the surface of the dielectric film and changes an electric resistance thereof in response to temperature, wherein:

the flow quantity measuring device measures the flow quantity of the air, which flows in the airflow passage, based on a measurement difference between a measurement of the upstream side sensing resistor and a measurement of the downstream side sensing resistor;

the upstream side sensing resistor and the downstream side sensing resistor extend generally parallel to each other in a longitudinal direction thereof, which is generally perpendicular to the flow direction of the air and is generally parallel to the surface of the dielectric film;

an area, which is held between and is defined by the upstream side sensing resistor and the downstream side sensing resistor on the surface of the dielectric film, forms a sensing area that is provided to sense the measurement difference and has first and second longitudinal end edges located on first and second sides, respectively, of the flow quantity measuring device;

the heating resistor forms a heat generating area that heats the sensing area and has first and second longitudinal end edges located on the first and second sides, respectively, of the flow quantity measuring device;

first and second electric potential ends of the heating resistor are placed at the first longitudinal end edge of the heat generating area;

the first longitudinal end edge of the heat generating area projects from the first longitudinal end edge of the sensing area toward the first side of the flow quantity measuring device;

the heating resistor, the upstream side sensing resistor and the downstream side sensing resistor are configured to satisfy a following equation:

$$54/100 \leq L1/L0 \leq 81/100$$

where $L0$ denotes a distance between the first longitudinal end edge and the second longitudinal end edge of the heat generating area measured in the longitudinal direction, and $L1$ denotes a distance between the first longitudinal end edge of the heat generating area and a half location at ½ of a length of the upstream side and downstream side sensing resistors.

10. The flow quantity measuring device according to claim 9, wherein a distance between the first longitudinal end edge of the heat generating area and a longitudinal location, at which a temperature difference between an upstream side and a downstream side of the heating resistor is maximum, is generally the same as the distance between the first longitudinal end edge of the heat generating area and the half location.

* * * * *